United States Patent [19]
Chung

[11] Patent Number: 5,903,416
[45] Date of Patent: May 11, 1999

[54] MAGNETIC HEAD AND MANUFACTURING METHOD THEREOF

[75] Inventor: Byung-soo Chung, Suwon, Rep. of Korea

[73] Assignee: Samsung Electronics Co., Ltd., Kyungki-Do, Rep. of Korea

[21] Appl. No.: 08/694,681

[22] Filed: Aug. 9, 1996

[30] Foreign Application Priority Data

Aug. 9, 1995 [KR] Rep. of Korea ...................... 95-24533
May 15, 1996 [KR] Rep. of Korea ...................... 96-16233

[51] Int. Cl.⁶ .................................................. G11B 21/00
[52] U.S. Cl. ....................... 360/122; 360/113; 204/192.11
[58] Field of Search ..................................... 360/113, 122; 204/192.11

[56] References Cited

U.S. PATENT DOCUMENTS

| | | | |
|---|---|---|---|
| 4,503,125 | 3/1985 | Nelson | 428/408 |
| 5,470,447 | 11/1995 | Mahvan | 204/192.16 |
| 5,510,168 | 4/1996 | Mori | 428/141 |
| 5,673,161 | 9/1997 | Yanagisawa | 360/103 |

*Primary Examiner*—Ceila Chang
*Attorney, Agent, or Firm*—Sughrue, Mion, Zinn, Macpeak & Seas, PLLC

[57] ABSTRACT

A magnetic head has a titanium oxide layer and titanium layer between a chip core and a diamond-like carbon (DLC) layer, to improve adhesion between the DLC layer and the chip core and thereby prevent the separation of the DLC layer from the surface of the chip core.

6 Claims, 5 Drawing Sheets

MAGNETIC HEAD AND MANUFACTURING METHOD THEREOF

BACKGROUND OF THE INVENTION

1. Field of the Invention

The present invention relates to a magnetic head and a manufacturing method thereof, and more particularly, to a magnetic head in which adhesion of a diamond-like carbon layer is improved and a manufacturing method therefor.

2. Description of the Related Art

Devices such as a videocassette recorder, an audio cassette tape player and a disk drive of a computer adopt a magnetic head as a means for performing magnetic recording and reading out of information. The magnetic head consists primarily of a magnetic metal material, i.e., ferrite. In the videocassette recorder, for example, a magnetic layer of video tape is formed by evenly depositing fine ferromagnetic powder on a base of polyester using a resin binder. The magnetic head made of ferrite contacts the magnetic layer of the video tape, i.e. the recording medium, thereby reading out information recorded thereon in a known manner.

As described above, the magnetic head continuously contacts the recording medium having the magnetic layer, so that the surface of the magnetic head may be abraded. In order to prevent abrasion of the magnetic head, a diamond-like carbon (DLC) layer with a high degree of hardness typically is deposited on the surface of the magnetic head.

FIG. 1 is a flowchart illustrating a method for manufacturing a magnetic head for the videocassette recorder, suggested by the present inventor. FIG. 2 illustrates the chip core manufacturing step 11 of FIG. 1 in detail, and FIG. 3 is a perspective view of the magnetic head manufactured according to the method of FIG. 1.

Referring first to FIG. 2, in manufacturing the chip core of the magnetic head from blocks of ferrite stock $21a$ and $21b$, winding slots and track channels are formed in the opposing surface thereof, which then undergo polishing to thereby form chip core halves $21a'$ and $21b'$. Silicon oxide (i.e., a non-magnetic substance) layers $22a$ and $22b$ are deposited on the respective polished surfaces and the thus-processed ferrite blocks $21a''$ and $21b''$ are combined. A chip core block 24 is formed through a predetermined process of shaping and polishing and then is sliced into chip cores 25. The obtained chip core includes an upper surface 26 and a gap 27.

Referring now to FIG. 1, after manufacturing the chip core in step 11 as described above, the chip core is assembled with a substrate in step 12. Here, the chip core 25 is attached to a head base (not shown) through ultraviolet bonding. Then, after a coil is wound around the chip core 25 in step 13, the dynamic characteristics of the primarily completed magnetic head are evaluated in step 14 to screen out inferior products and thus prevent unnecessary subsequent processing for heads which would ultimately fail final analysis. In step 15, the pre-screened chip cores with windings, and especially the upper surfaces thereof, are washed by air bubbles generated by an ultrasonic wave generator installed in a bath, and then dried by a hot-air drying method. In step 16, the upper surface 26 is first smoothed by etching with ionized argon gas ($Ar^+$) and a DLC layer is formed thereon through two deposition processes to provide a uniform coating. The deposition is performed by known methods such as chemical vapor deposition (CVD) or physical vapor deposition (PVD). Another dynamic characteristic examination is performed in step 17 for examining the characteristics of the final magnetic head. Thereafter, the magnetic heads are paired together for installation in a head drum, by selection according to the dynamic characteristics obtained in step 17.

FIG. 3 shows a magnetic head manufactured by the steps noted above. In FIG. 3, the magnetic head comprises a chip core 25 including two core members $25a$ and $25b$ separated by the gap 27 having a width W, coils 28 wound around the core members, and a DLC layer 29 deposited on the upper surface 26 of the chip core 25. Also, a recess 30 which communicates with and end of the gap 27 is formed in the upper surface 26 and is filled with reinforced glass (not shown) to define a gap length L.

The DLC layer of the magnetic head manufactured by the method above is as a solid amorphous film and has the same hardness, lubricant properties, anti-abrasion properties, electrical insulating properties and chemical stability as a diamond. However, even though the hardness of the DLC layer is efficient for preventing abrasion of the magnetic head, the DLC layer may be easily separated from the ferrite due to a force generated when the magnetic head contacts the video tape. Also, ferrite particles which become separated from the ferrite core, act as a foreign substance between the magnetic head and the recording medium.

SUMMARY OF THE INVENTION

To solve the above problems, it is an object of the present invention to provide a magnetic head having a diamond-like carbon layer whose adhesion force to the surface of a chip core is improved.

It is another object of the present invention to provide a magnetic head having a titanium layer and titanium oxide layer which are formed between the surface of the chip core and the diamond-like carbon layer.

It is still another object of the present invention to provide a method of manufacturing a magnetic head having a titanium layer and titanium oxide layer between the surface of the chip core and the diamond-like carbon layer.

To achieve the first and second objects, there is provided a magnetic head comprising: a chip core; a coil wound around the chip core; and a dimond-like carbon (DLC) layer for contacting a magnetic recording medium. A titanium oxide layer and a titanium layer are formed between the DLC layer and the upper surface of the chip core.

Preferably, the thicknesses of the titanium oxide layer and titanium layer are each 20 Å to 50 Å, and more preferably 20 Å.

It is preferable that the thickness of the DLC layer is 150 Å to 200Å.

To achieve the third object, there is provided a magnetic head manufacturing method comprising the steps of: (a) etching the surface of a chip core for contacting a magnetic recording medium to reduce surface irregularities and remove foreign material; (b) forming a titanium oxide layer of a predetermined thickness on the etched surface of the chip core; (c) forming a titanium layer of a predetermined thickness on the titanium oxide layer; and (d) forming a DLC layer on the titanium layer.

Preferably, the etching step is a sputtering etching process with ionized argon gas ($Ar^{30}$) and oxygen gas ($O_2^{30}$) which is performed in a vacuum chamber, wherein the etching process with argon gas is performed for thirty minutes at a pressure of 0.042 Pa and at an accelerating voltage of 6.0 kV, and the etching process with oxygen gas is performed for five minutes at a pressure of 0.042 Pa and at an accelerating voltage of 4.0 kV.

Preferably, step (b) is performed at an oxygen pressure of 0.06 Pa in a vacuum chamber of a sputtering apparatus in which a titanium oxide target is provided and an electrical power of 30 V at 110 A is applied for thirty seconds.

Preferably, step (c) is performed at an oxygen pressure of 0.06 Pa in a vacuum chamber of a sputtering apparatus in which a titanium target is provided and an electrical power of 30 V at 110 A is applied for thirty seconds.

Preferably, step (d) is performed by repeatedly depositing the DLC layer in a predetermined thickness and partially etching the thickness of the deposited DLC layer.

Preferably, step (d) is performed using a carbon plasma generator having an accumulator voltage of 300 V, an ignition voltage of 300 V, and a pulse frequency of 1 Hz, and the etching is performed for five minutes in a vacuum chamber under at an oxygen pressure of 0.042 Pa and an accelerating voltage of 4.0 kV.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Figure 3:
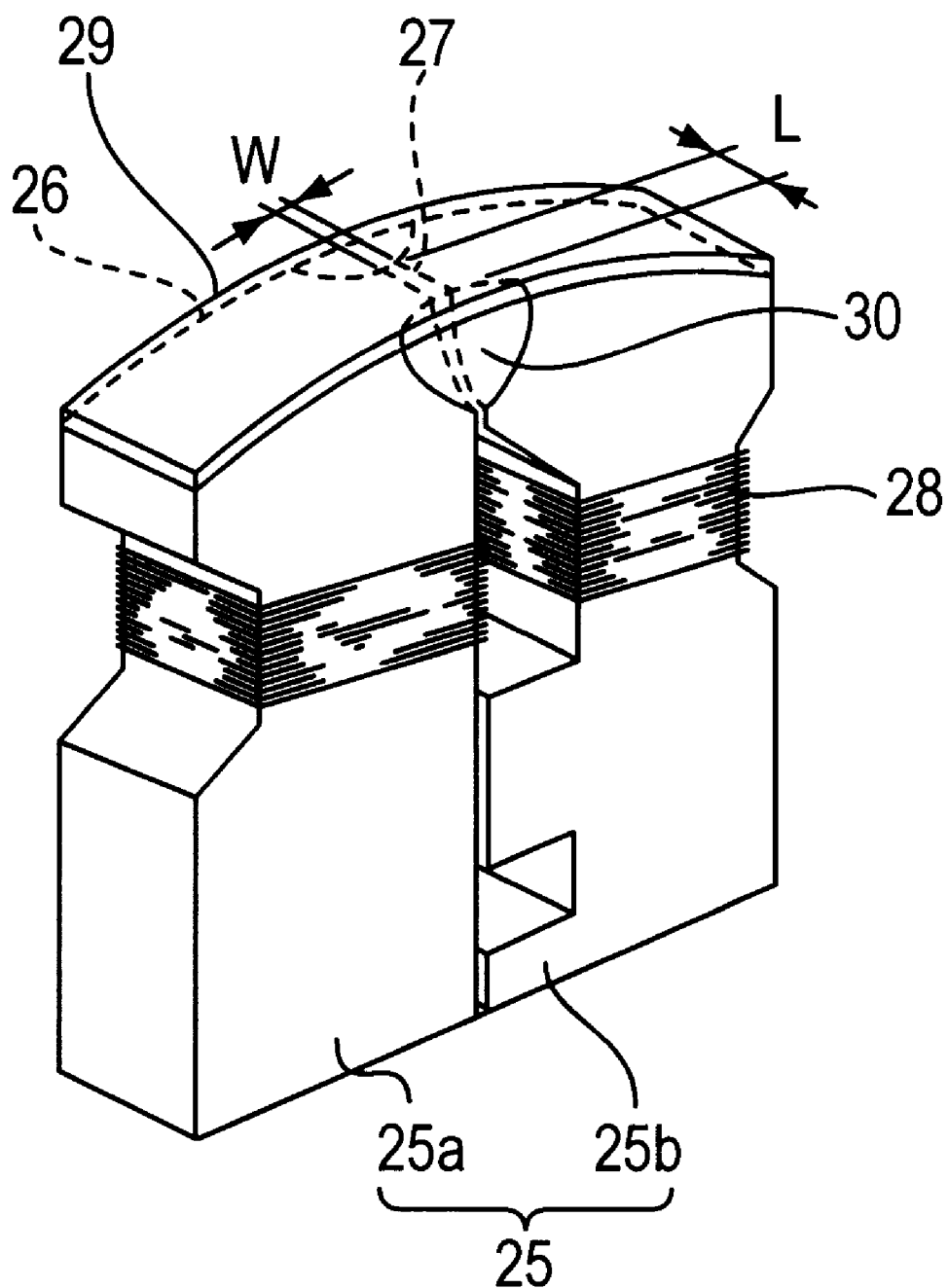
FIG. 3 is a schematic perspective view of the magnetic head manufactured according to the method of FIG. 1.
Figure 4:
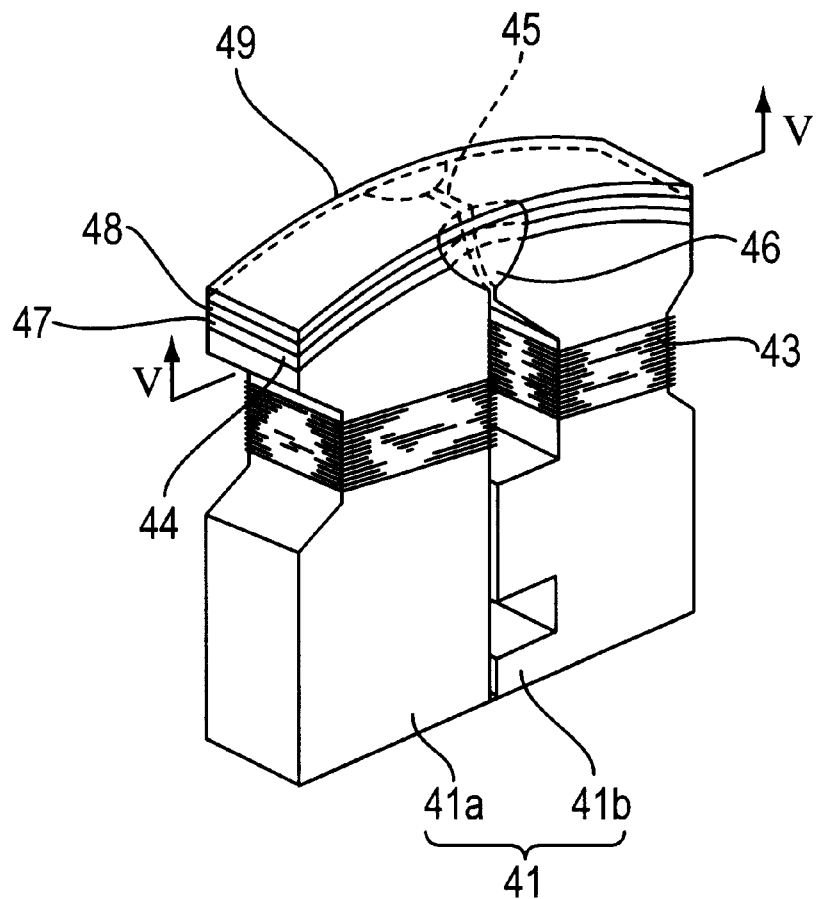
FIG. 4 is a schematic perspective view of a magnetic head according to a preferred embodiment of the present invention.

As shown in FIG. 4, the basic structure of the magnetic head according to the present invention is similar to that shown in FIG. 3. That is, the magnetic head includes a chip core 41 having core members 41a and 41b, coils 43 wound around the core members and a diamond-like carbon (DLC) layer 49 deposited on an upper surface 44. Also, a gap 45 and a recess 46 defining the length of the gap 45 are formed on the upper surface 44. However, in contrast to the magnetic head discussed above, a titanium oxide (TiO) layer 47 and titanium (Ti) layer 48 are stacked in sequence between the upper surface 44 of the chip core and the DLC layer 49.

Figure 5:
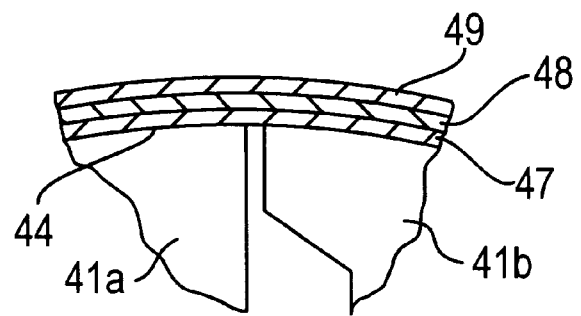
FIG. 5 is a cross-section view of a portion cut along line V—V of FIG. 4.

As illustrated in FIG. 5, the TiO layer 47 and the Ti layer 48 are stacked between the upper surface 44 of the core members 41a and 41b and the DLC layer 49. This is because titanium oxide has better adhesion to the ferrite, which is commonly used as the material for manufacturing the chip core, than the DLC layer, and titanium has better adhesion to the DLC layer than the ferrite. That is, layers having relatively strong adhesion force are interposed between the surface of the ferrite and the DLC layer, thereby preventing the DLC layer from being separated from the surface of the magnetic head.

Figure 1:
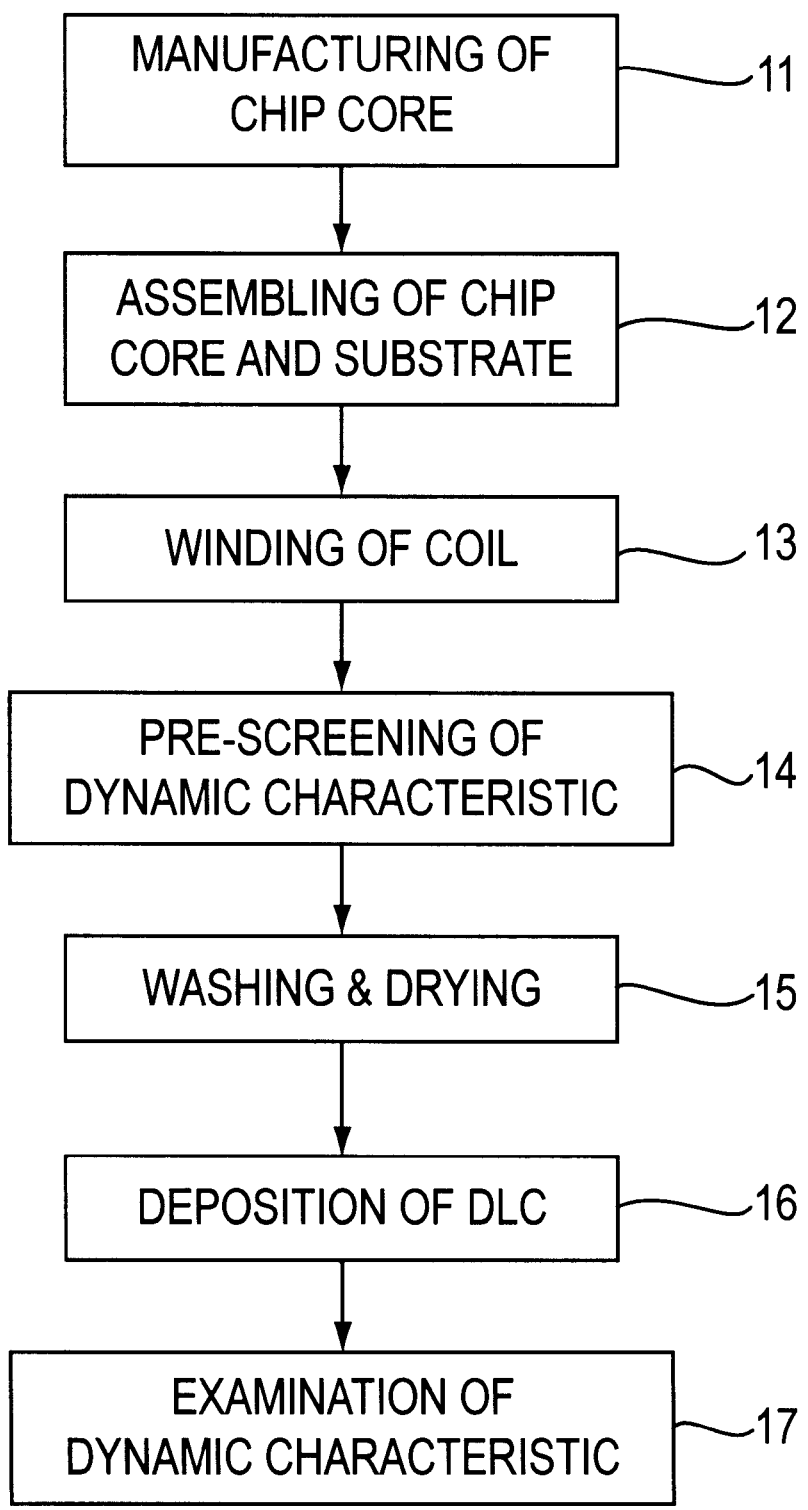
FIG. 1 is a flowchart illustrating a method for manufacturing a magnetic head, suggested by the present applicant.
Figure 2:
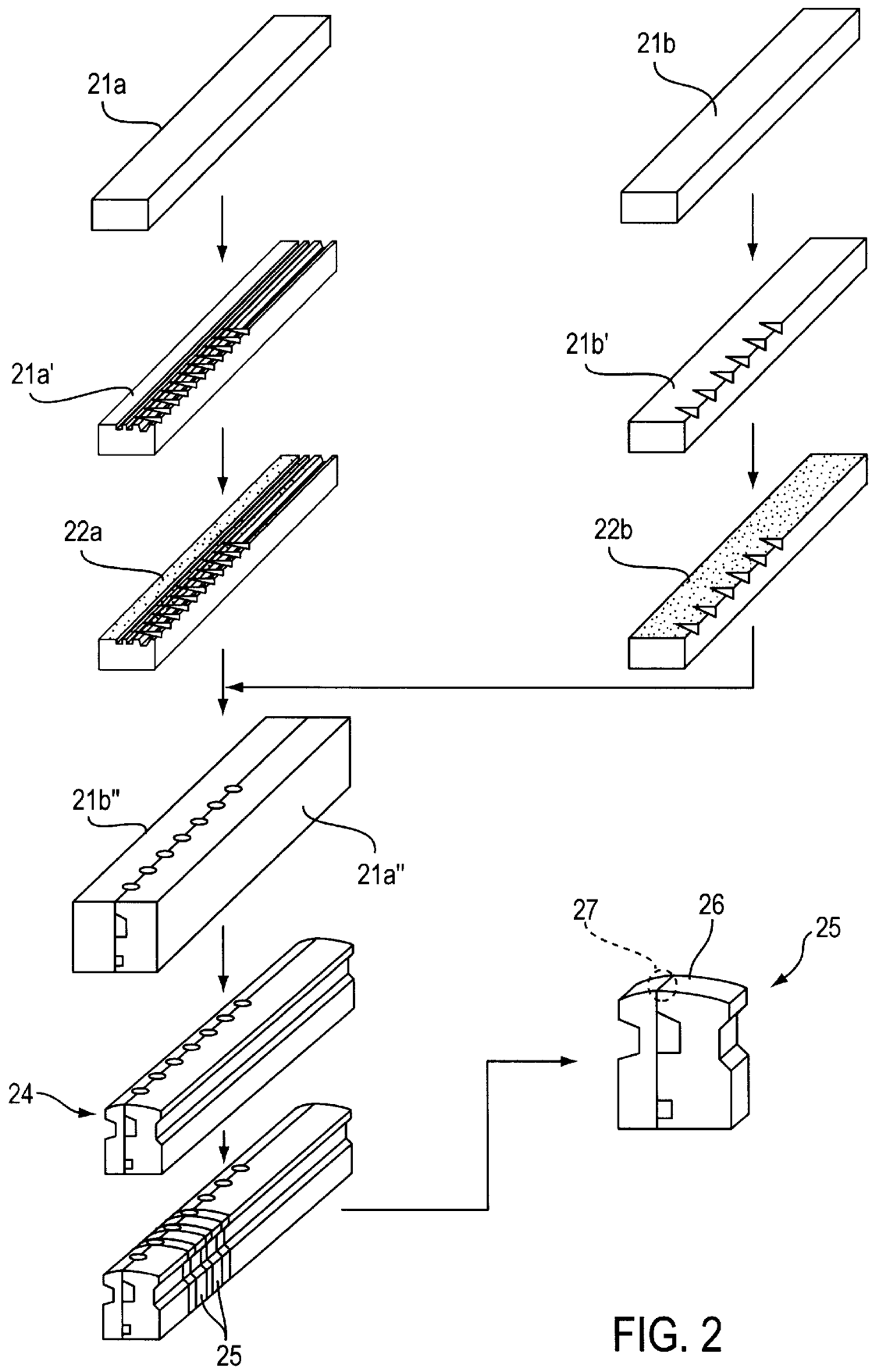
FIG. 2 is a perspective view showing the chip core manufacturing step of FIG. 1.

The magnetic head according to the present invention is manufactured essentially as illustrated in FIG. 1, but further includes the formation of the TiO layer and the Ti prior to the DLC deposition step. Further, the DLC deposition may be performed by a new method of repeating the processes of etching and deposition as described below.

FIGS. 6A to 6E illustrate the etching and depositing processes which are performed to form the layers in a preferred embodiment. Since this process is different from the one described above, the resulting layers are labeled with different reference numerals.

Figure 6A:
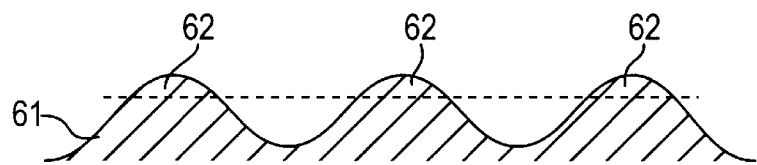
FIGS. 6A to 6E are cross-section views illustrating the process of stacking layers on the surface of the magnetic head according to a preferred embodiment of the present invention.

Referring to FIG. 6A, the surface of the chip core 61 is irregular, including protrusions and depressions, and may even be covered with foreign material (not shown). Thus, an etching process is performed to reduce the surface roughness and remove any foreign material. This etching process may be performed using ionized argon gas ($Ar^+$) and ionized oxygen gas ($O_2^+$) in a known sputtering etching apparatus. According to the preferred embodiment, foreign material is removed from the surface by etching with the ionized argon gas in a vacuum chamber for thirty minutes under an argon pressure of 0.042 Pa and using an accelerating voltage of 6.0 kV. Then, the surface roughness is reduced by etching with the ionized oxygen gas for five minutes under an oxygen pressure of 0.042 Pa and using an accelerating voltage of 4.0 kV. Thus, ferrite protrusions 62 above the dashed line in FIG. 6A are removed.

Figure 6B:
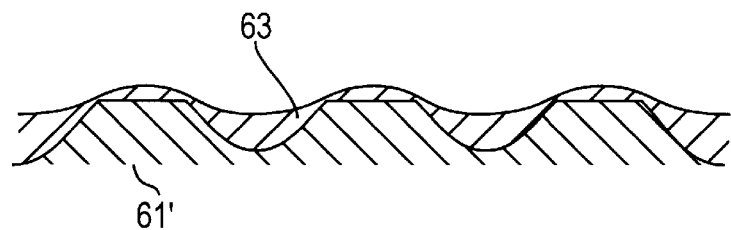

FIG. 6B shows a TiO layer 63 deposited on the etched chip core surface 61' resulting from the above etching processes. The deposition of the TiO layer 63 may be performed by a known sputtering method. For example, for the deposition process, an oxygen pressure of 0.06 Pa is maintained in a vacuum chamber of the sputtering apparatus in which a TiO target is installed, and an electrical power of 30 V at 110 A is applied to the target for thirty seconds. Here, the sputtering conditions may be controlled to form a TiO layer having an average thickness of 10Å to 50Å and preferably 20 Å.

Figure 6C:
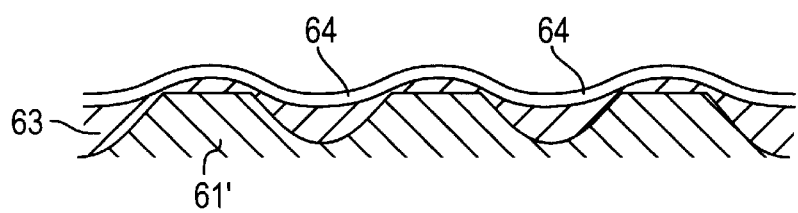

FIG. 6C shows a Ti layer 64 deposited on the TiO layer 63. The Ti layer 64 exhibits better adhesion with respect to both the TiO layer 63 deposited thereunder and a DLC layer to be deposited thereon, so that the DLC layer can be stably formed. As in the case of the above TiO deposition, in the deposition of the Ti layer 64, an oxygen pressure of 0.06 Pa is maintained in a vacuum chamber of the sputtering apparatus in which a Ti target is installed, and an electrical power of 30 V at 110 A is applied to the target for thirty seconds. Also, the sputtering conditions may be controlled to form the Ti layer 64 with a thickness of 20Å to 60Å and preferably 20Å.

Figure 6D:
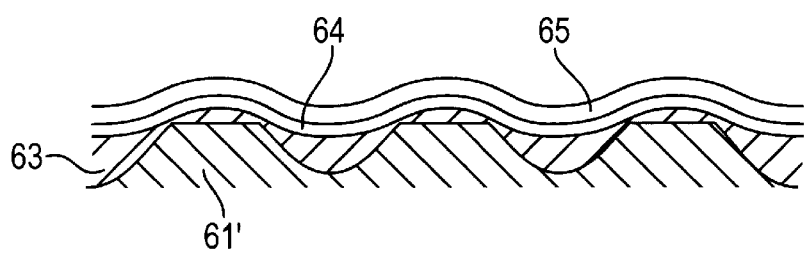

FIG. 6D shows a DLC layer 65 which is deposited after completion of formation of the TiO layer 63 and Ti layer 64. The DLC layer 65 may be deposited by one of two methods.

As a first method, the DLC layer 25 is formed by a single deposition process which is continued until reaching the desired thickness. For example, a general sputtering process is performed until a DLC thickness of 250Å is obtained.

As a second method, the DLC layer may be formed by the above-described repeated deposition and etching processes. First, the DLC layer 65 is deposited to a thickness of 100Å and is then partially etched with ionized oxygen gas ($O_2^+$). The deposition can be performed using a carbon plasma generator with an accumulator voltage of 300 V, ignition voltage of 300 V, and pulse frequency of 1 Hz; and the etching process can be performed in a vacuum chamber for five minutes at oxygen pressure of 0.042 Pa and an accelerating voltage of 4.0 kV.

Figure 6E:
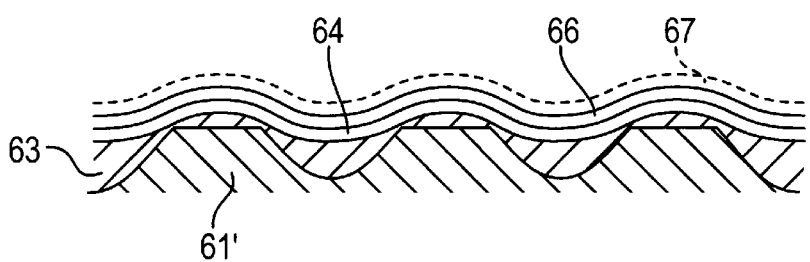

As shown in FIG. 6E, the thickness of the remaining DLC layer 66 after the first deposition and etching processes is 10Å to 20Å. In FIG. 6E, a portion 67 on the DLC layer 66, represented by a dashed line, represents the DLC layer which is removed by the etching process. Then, another DLC layer is deposited at a thickness of 100Å and then etched with ionized oxygen gas ($O_2^+$), thereby leaving a second DLC layer (not shown) with thickness of 10Å to 20Å. These deposition and etching processes of the DLC layer are repeated until the total thickness of the DLC layers reaches a desired thickness. Preferably, a total of ten depositions and etching processes are performed, and the deposition and etching conditions are controlled to form the DLC layer having the total thickness of 150Å to 200Å. The thus-obtained DLC layer exhibits improved titanium-to-ferrite adhesion compared with that obtained through a one-time deposition process.

The above etching and deposition processes may also be performed by known CVD or PVD methods.

According to the magnetic head of the present invention, adhesion between the DLC layer and the chip core is improved by the intervening formation of the Tio and Ti layers, so that the separation of the DLC layer can be prevented.

While the present invention has been illustrated and described with reference to a specific embodiment, further modifications will be apparent to those skilled in the art, and are within the scope of the invention as defined by the appended claims.

What is claimed is:

1. A magnetic head comprising:
    a chip core;
    a coil wound around said chip core;
    a diamond-like carbon (DLC) layer adapted to contacting a magnetic recording medium; and
    a titanium oxide layer and a titanium layer stacked in sequence between the upper surface of said chip core and said DLC layer.

2. A magnetic head as claimed in claim 1, wherein the thicknesses of said titanium oxide layer and said titanium layer are each in the range of 20Å to 50Å.

3. A magnetic head as claimed in claim 2, wherein the thicknesses of said titanium oxide layer and said titanium layer are each 20Å.

4. A magnetic head as claimed in claim 2, wherein the thickness of said DLC layer is in the range of 150Å to 200Å.

5. A magnetic head as claimed in claim 1, wherein said titanium oxide layer is formed on the upper surface of said chip core, said titanium layer is disposed on said titanium oxide layer, and said DLC layer is disposed on said titanium layer.

6. A magnetic head as claimed in claim 1, wherein said chip core is formed of ferrite and said titanium oxide layer is layered on the upper surface of the ferrite chip core.

* * * * *